United States Patent Office 3,403,163
Patented Sept. 24, 1968

3,403,163
METAL ALKOXIDES AND METHODS OF
MAKING THE SAME
Charles H. Fuchsman, Cleveland Heights, Ohio, assignor to Ferro Corporation, Cleveland, Ohio, a corporation of Ohio
No Drawing. Continuation-in-part of application Ser. No. 64,705, Oct. 25, 1960. This application Sept. 11, 1962, Ser. No. 222,951
22 Claims. (Cl. 260—309.6)

This application is a continuation-in-part of my copending application Ser. No. 64,705 filed Oct. 25, 1960, now abandoned.

This invention relates, as indicated, to new and useful metal alkoxides of certain alcohols, hereinafter more particularly described, and to the method of producing such materials. More particularly, this invention relates to bivalent metal alkoxides produced by reacting bivalent metal salt of a monocarboxylic acid with an alcohol which is characterized by the presence therein of a hydroxyl group attached to three other atoms so as to replace the hydrogen of such hydroxyl group with the hydrogen equivalent of the metal, and which alcohol is further characterized by the presence in the molecule of an additional functional group as hereinafter more particularly described.

The reaction between a bivalent metal carboxylate and an alcohol is generally regarded as a most unlikely reaction because the energy required to form a metal alcoholate, or alkoxide, is much greater than that which is available when the metal is combined in a carboxylic acid. It would, in fact, be expected that an alcoholate in the presence of a free-carboxylic acid would react to form the metal carboxylate and liberate the alcohol.

It has been found, however, that where the alcohol contains at least one additional functional group attached to a carbon atom that is in a position alpha or beta to the carbon atom to which the hydrocarbon group entering into the reaction is attached, will react with bivalent metal carboxylates to yield the corresponding bivalent metal alkoxide of the alcohol. Not all bivalent metals are useful in this process, and it is believed that relative chelatability plays an important part in determining the bivalent metals useful herein. For example, the alkaline earth metals which have low relative chelatability in the form of their carboxylates do not appear to undergo this rather surprising reaction. The alkali metals also do not undergo this reaction. It has been found further that this reaction appears to be limited to those metals which are bivalent in their oxides or in the salts they form with carboxylic acids. Such oxides or salts may be represented as MO or as (RCOO)$_2$M, respectively, where M is a bivalent metal, whose standard single electrode potential for the reaction $M^n + ne \rightarrow M$ is more positive (that is, less negative) than —1.0. Since different conventions are sometimes used to assign positive or negative signs, it should be understood that the sign of the potential in this disclosure corresponds to that used in Lange's "Handbook of Chemistry" ninth edition, p. 1213–18.

Those metals which do not form carboxylates of the formula (RCOO)$_2$M, such as molybdenum, tungsten, vanadium and silicon, also do not appear to undergo the desired reaction from the carboxylates in the presence of the alcohols of this invention. These latter metals normally exist in valences in excess of 2 and have oxides which may be regarded as acidic in the sense that they tend to form compounds which ionize in a manner which leaves the subject metal in the anion instead of the cation.

The present invention provides novel metal alkoxides and novel methods of making the same, the method comprising reacting (a) a divalent metal salt of a carboxylic acid in which the metal has a single electrode potential more positive than —1.0 volt for the reaction $M^n + ne \rightarrow M$, and the carboxylic acid which is preferably aliphatic and contains from as low as two to as high as 30 carbon atoms and (b) an alcohol having a functional group such as an oxygen atom, a sulfur atom and a nitrogen atom attached to an alpha or beta carbon atom with respect to the carbon atom carrying the alcoholic —OH group, such an alcohol being (1) an alcohol having about 8 to 28 carbon atoms and having a residue of a fatty acid in its molecular chain of at least 8 carbon atoms, the alcohol being a fatty acid-imidazoline condensation product having the general formula:

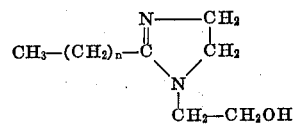

where $n$ is 6 to 20; (2) a polyfunctional alcohol having the general formula:

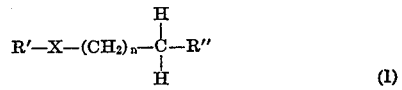

and

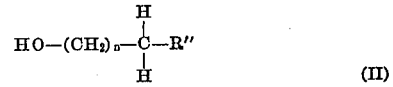

wherein R' is a radical selected from the group consisting of alkyl, aryl, alkaryl, aralkyl, cycloalkyl, alkoxyalkyl, alkoxyaryl, aroxyalkyl, alkoxycycloalkyl, cycloalkoxyalkyl, hydroxyalkyl, hydroxycycloalkyl and hydroxyalkoxyalkyl; X is selected from the group consisting of oxygen and sulphur, R" is selected from the group consisting of hydrogen and R' radicals; and $n$ is an integer from 1 to 2, such as thiodiethanol and ethylene glycol; (3) a cyclic ether-alcohol compound having a cyclic structure including an ether oxygen atom and a hydroxyl group attached to a carbon atom in a position alpha or beta to said ether oxygen atom, such as tetrahydrofurfuryl alcohol and tetrahydropyrane 2-methanol; and (4) an amino alcohol having an amino nitrogen atom attached to a carbon atom in a position alpha or beta to the carbon atom carrying the hydroxyl group such as diethylaminoethanol and dimethylaminoethanol.

A preferred alcohol component of the metal alkoxides or alcoholates is an alcohol having 8 to 28 carbon atoms and having a fatty acid residue of at least 8 carbon atoms in its molecular chain such as the fatty acid-imidazoline condensation product having the general formula:

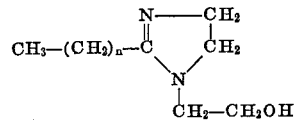

where $n$ is 6 to 20.

Also suitable is the imidazoline reaction product of oleic acid—such a material being sold commercially as Amide O by Geigy Industrial Chemicals, a Division of Geigy Chemical Corporation, Yonkers, New York.

A suitable alcohol is one having the above general formula of the fatty acid-imidazoline condensation product except that a propanol group is attached to the tertiary amino nitrogen atom instead of the ethanol group. As is seen in the latter structure, the functional tertiary amino is attached to a carbon atom beta to the C—OH group.

The preferred alcohols are alcohols of the general Formula I or II above described and the fatty acid-imidazoline condensation products in which a tertiary nitrogen atom is attached to a carbon atom that is alpha or beta to the C—OH group.

Also, the cyclic ether-alcohols are excellent and, generally, although not as desirable in some cases as the above preferred alcohols, their use provides good results. One of the preferred cyclic ether-alcohol alkoxides of the present invention is one formed from a cyclic ether-alcohol material having a cyclic configuration in which the hydroxyl group is attached to a carbon atom beta or gamma to the ether oxygen atom of the cyclic structure. Suitable cyclic ether-alcohol materials, preferably having about 5 to 7 carbon atoms, are tetrahydrofurfuryl alcohol, tetrahydropyrane-2-methanol and tetrahydropyrane-2-ethanol.

Also suitable as the alcohol component of the alkoxides are amino alcohols preferably having about 4 to 8 carbon atoms and having tertiary amino nitrogen atom attached to a carbon atom in a position alpha or beta to the C—OH group. Suitable amino alcohols are diethyl aminoethanol, dipropyl aminoethanol, diethyl amino propanol and dimethylaminoethanol.

As to the alcohols of Formulas I and II, the structures which result from this reaction are of two types, or mixtures thereof, and are believed to have structural formulas as follows:

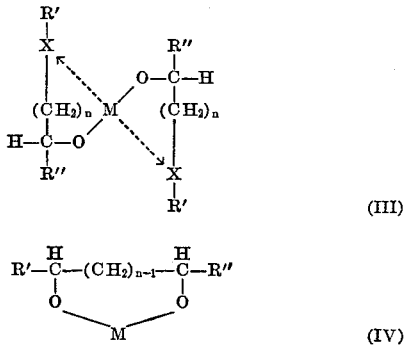

(III)

(IV)

with materials having the Formula IV, co-ordinate valence bonds are believed to exist on an intermolecular basis, e.g.

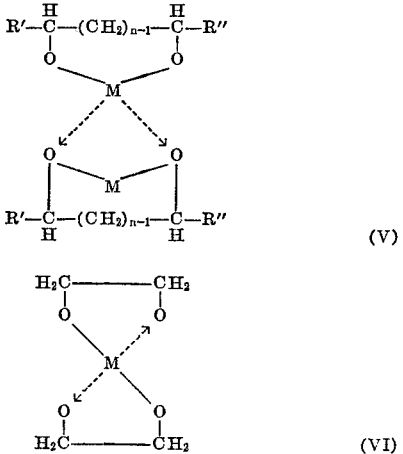

(V)

(VI)

The reactions may be conducted in a solvent; or where the alcohol is liquid at the reaction temperature, an excess of alcohol may be used as the solvent. The reactions may be conducted at atmospheric pressure or under vacuum and the temperature may range from room temperature to the temperature at which the carboxylic acid produced in the course of the reaction volatilizes under the conditions of pressure employed.

The metal carboxylates useful in the process hereof are preferably aliphatic carboxylic acids containing at least 2 carbon atoms. The upper limit of carbon atoms is not significant, it being only necessary to remove the carboxylic acid liberated in the course of the reaction, as by volatilization under suitable conditions of temperature and pressure (usually sub-atmospheric pressure). Abietic acid, which contains 20 carbon atoms may be used, as well as naphthenic acids boiling at 300° C. at 0.1 mm. Hg and containing up to 30 carbon atoms and cycloaliphatic structure. The term "aliphatic" as used herein will be understood as including those aliphatic materials characterized cyclic structure, such as 5 or 6 carbon atom ring structure Because of the ease of handling and simplification of the equipment, bivalent metal carboxylates of carboxylic acids containing from 2 to 8 carbon atoms, and especially acetic acid, are preferred.

Accordingly, there may be employed in accordance herewith, for example, bivalent metal salts such as zinc acetate, zinc propionate, zinc butyrate, zinc hexoate, zinc caproate, zinc 2-ethyl hexoate, zinc ricinoleate, zinc laurate, zinc stearate, zinc tallate, zinc naphthenate, zinc abietate, and corresponding carboxylates of iron, cadmium, cobalt, nickel, tin, copper and mercury exemplified by ferrous acetate, cadmium butyrate, cobalt naphthenate, nickel acetate, stannous octoate, cupric hexahydrobenzoate, mercuric acetate and others which will become readily apparent from the foregoing. Such salts as these may be reacted with any member of the class of alcohols above described in a manner such as hereinafter exemplified.

The alcohols from which the metal alkoxides may be made constitute a limited group of materials as indicated above in Formulas I and II characterized by an alpha or beta substituent or functional group. While primary alcohols are preferred, secondary alcohols may also be used as indicated below in the specific examples. Thus, R'' in Formula I may be hydrogen, or an alkyl group, such as methyl, ethyl, propyl, iso-propyl, butyl, t-butyl, amyl, t-amyl, hexyl, cyclohexyl, 2-ethyl hexyl, nonyl, decyl, dodecyl, lauryl, cetyl and octadecyl; or, these alkyl groups may contain oxygen attached to two carbon atoms or to a single carbon atom. In the latter case the oxygen may be singly bonded to such carbon atom as hydroxyl. The radical R' includes the same radicals as mentioned above as useful for R'' with the exception of hydrogen, and additionally aryl radicals such as phenyl and naphthyl; alkaryl radicals such as cresyl, xylyl, mesityl, p-ethylphenyl, p-t-butylphenyl, p-2-ethylhexylphenyl, p-1,3,3-tetramethylbutylphenyl, p-dodecylphenyl; aralkyl radicals, such as benzyl, phenylethyl, phenylcyclohexyl; cycloalkyl radicals, such as cyclohexyl, cyclopentyl, methylcyclohexyl; alkoxyalkyl radicals, such as methoxyethyl, ethoxymethyl, ethoxyethyl, ethoxyphenyl; aroxyalkyl radicals such as phenoxymethyl, phenoxyethyl, phenoxypropyl; aroxyaryl radicals such as phenoxyphenyl; alkoxycycloalkyl radicals, such as methoxycyclohexyl, ethoxycyclohexyl; cycloalkoxyalkyl radicals, such as cyclohexoxymethyl, cyclohexoxyethyl; hydroxyalkyl radicals, such as hydroxymethyl, hydroxyethyl, hydroxypropropyl, hydroxybutyl, hydroxyoctyl; hydrocycloalkyls, such as p-hydroxycyclohexyl; and hydroxyalkoxyl alkyl radicals such as hydroxyethoxyethyl, hydroxypolyethoxyethyl.

The positions of X with respect to the reference hydroxy group of Formula I is critical. It must be attached to an alpha or beta carbon atom with respect to the C—OH group, i.e., n must be 1 or 2. This same structure is necessary in the case of the ether oxygen of the cyclic ether-alcohols and the tertiary amino nitrogen atom of the fatty acid-imidazoline condensation products and the amino alcohols. The oxygen or sulfur group of Formula I or II is capable of co-ordinate co-valent linkage with the various bivalent metals thereby forming a very stable compound. Specific examples of alcohols illustrative of the class useful in accordance herewith include, therefore, ethylene glycol, 1,3-propylene glycol, diethylene glycol, dipropylene glycol, butanediol-1,2; glycerol, thiodiethanol, thiodipropanol, propyl thioethanol, phenylthioethanol, phenoxyethanol, butoxyethanol, cyclomethoxyethanol, methoxyphenylethanol, 9,10-dihydroxy stearol, sorbitol, mannitol, pentaerythritol, erythritol, 1,3-pentanediol, 2,2-dimethylpropanediol-1,3; monethyl ether of ethylene glycol, monomethyl ether of ethylene glycol, monomethyl thioether of ethylene glycol, monobutyl ether of ethylene glycol, monomethyl ether of diethylene glycol, monoethyl ether of diethylene glycol, monobutyl ether of diethylene glycol, etc.

It becomes convenient at this point to illustrate the process and products of this invention by giving specific examples, it being understood that these examples are for illustrative purposes only and are not to be construed as limiting the scope of the invention.

Example 1

Nickel acetate tetrahydrate (A) was reacted with thiodiethanol (B) in various molar ratios of A:B, the results being tabulated in Table I below:

TABLE I

| Solvent | Mole ratio A:B | Max. reaction temp., °C. | Acid recovered (percent of theory) |
|---|---|---|---|
| (1) None | 1:2 | 180 | 25 |
| (2) None | 1:2 | ¹ 155 | 74 |
| (3) Xylene | 1:2 | ¹ 195 | 68 |
| (4) Xylene | 1:2 | ¹ 140 | (²) |

¹ Under vacuum.
² Not measured.

It will be observed from Table I that the imposition of sub-atmospheric pressure tends to promote the reaction by assisting in the removal of the acetic acid from the reaction mass and limiting the amount of conversion to ester. The nickel analysis of the product produced in accordance with the four examples of Table I were very close to theoretical in all cases. The nickel alkoxides were readily separated from the reaction mass since the reaction product is xylene-soluble. The failure of the acid recovered to more nearly approach theoretical is attributable at least in part to the tendency of the acid to compete with the nickel carboxylate for reaction with the alcohol to form esters.

Example 2

Other reactions of nickel acetate tetrahydrate in a mole ratio of 1:2 are tabulated in Table II below:

TABLE II

| Alcohol | Solvent | Max. reaction temp. | Percent acid recovered |
|---|---|---|---|
| Ethylthioethanol | Xylene | 142 | 65 |
| Diethyleneglycol | None | 185 | 48 |
| Ethylene glycol | do | 150 | |
| 2-methyl-2,4-pentanediol | Xylene | 175 | 13 |
| Pentaerythritol | Xylene+dimethyl formamide | 165 | 53 |

In the case of ethylene glycol, the acid recovered was not measured quantitatively. However, the presence of acid was noted in the distillate, and the insoluble nickel acetate slowly disappeared going to a solution, another evidence of reaction.

Example 3

Nickel acetate tetrahydrate, 110 grams, and thiodiethanol, 107 grams, were placed in a 3-necked flask fitted with an agitator, a condenser, a pot temperature thermometer and a vapor temperature thermometer. No solvent was employed. In the first phase of the reaction, water is driven off, this evolution occurring at temperatures between 80° and 98° C. When the temperature is within the range of from 85° to 95°, a deep greencolored solution is obtained which gradually becomes lighter and turns to an almost white mass of pasty consistency. Heating is continued until the pot temperature reaches 125/135° C. in which ranges the pasty solid mass becomes fluid and returns to the dark green color. Heating is continued to a temperature of 183° C., and the system held under aspirator vacuum to remove acidic acid. The viscosity of the reaction mass increases. After the acidic acid has been removed, the contents of the flask are poured out into a pan and allowed to cool. There results a friable solid, dark green in color, which is pulverized to produce the desired product. This material contains 21.9% nickel, the theoretical content for the nickel di-(1-hydroxy ethylene-2,2'-thioethylene-1-oxide) being 19.52%. This product is slightly soluble in alcohol, acetone, methylethylketone, and xylene; and is soluble in very powerful solvents such as dimethyl formamide. If it is desirable to remove any remaining unreacted hydroxy compounds, or esters, the solids may be washed in cold alcohol. A similar purification step may be employed in the other preparations listed below.

Example 4

Nickel acetate tetrahydrate, 138 grams, and ethyl thioethanol, 122 grams, and xylene, 750 ml., were heated together under reflux for a period of 3 hours, after which time an additional 350 ml. of xylene were added and refluxing continued for a period of 1 hour. The resultant product was filtered, substantially the entire contents of the reaction flask passing through the filter paper. The dark green solution was stripped of solvent, and a solid material recovered in the manner set forth in Example 3 above. This product contained 23.05% nickel against a theoretical of 21.8% nickel for the nickel di-(ethyl thioethylene oxide). In the course of the reaction of this product, the reaction products pass through the characteristic green, very pale green, and back to dark green color transformation.

While the foregoing examples illustrate preparations of nickel alkoxides useful in accordance herewith utilizing nickel acetate tetrahydrate, a preferred reactant, it should be understood that other nickel carboxylates can be used in place of those illustrated. Under the conditions of the reaction, the acid produced should be capable of removal from the zone of reaction, or otherwise being rendered of reduced influence upon the desired reaction. Thus, any metal carboxylate of a $C_2$ to $C_{30}$ carboxylic acid may be used, and useful products have been made from nickel acetate, nickel 2-ethyl hexoate, nickel laurate, nickel oleate, nickel naphthenate and nickel tallate, illustrating the broad range of carboxylic acids from which the nickel salts may be made. In removing the less volatile acids it is often necessary to distill under reduced pressure to avoid decomposition of the acid or other reactants. Specific examples of nickel alkoxides have been illustrated above. Other nickel alkoxides useful in accordance herewith include: the nickel alkoxides, of each of thiodipropanol, diethylene glycol, butylthioethanol, butoxyethanol, cyclomethoxy ethanol, 1,3-butanediol, 1,3-dihydroxypentane, trimethyleneglycol, dipropylene glycol, 2,2-dimethylpropanediol-1,3; propylene glycol-1,2; butylene glycol-1,2; ethylene glycol-monoethyl ether, ethylene glycol monoethyl ether, ethylene glycol monobutyl ether, ethylene glycol monomethyl ether; mono-methyl ether of diethylene glycol, monoethyl ether of diethylene glycol and mono-butyl ether of diethylene glycol, nickel di-(1-hydroxy ethylene oxide), nickel di-(1-hydroxy ethoxy ethylene oxide), etc. Where the alcohols are di or polyhydric, the nickel alkoxide may be formed by Ni replacement of one or more of the available hydroxyl hydrogens. Six-membered rings are favored by nickel, i.e., where $n$ is 2, but five-membered rings (where $n$ is 1) are also formed without great difficulty.

Although nickel has been shown above as exemplary of the products and process of the present invention, other metals contemplated hereby with their single electrode potentials ($E_0$) for the reaction $M^n + ne \rightarrow M$ stated in parentheses following the metal name are as follows: zinc (−0.8), iron (−0.4), cadmium (−0.4), cobalt (−0.3), nickel (−0.2), tin (−0.1), copper (+0.1), mercury (+0.9). Chromium whose bivalent forms are less common than its trivalent forms can also be used in the formation of useful products in accordance herewith. The following examples illustrate the production of other metal alkoxides by the process of this invention.

Example 5

Thiodiethanol was reacted with cadmium acetate dihydrate in a mole ratio of 2:1 in xylene solution, the maximum temperature of the reaction being 150° C. of the theoretical acid recoverable, 57% was recovered. Upon removal of unreacted materials and solvent, the half cadmium alcoholate of thiodiethanol was isolated.

Example 6

Zinc acetate dihydrate was reacted with thiodiethanol in a mole ratio of 1:2. No solvent was used in the reaction, and the maximum temperature of the reaction was 150° C. Seventy-two percent of the theoretically recoverable acetic acid was recovered. Upon removal of unreacted materials, the half zinc alcoholate of thiodiethanol was recovered.

Example 7

Stannous acetate was used in place of zinc acetate in the preceding Example 4, the maximum temperature of the reaction being 150° C. More than 50% of the theoretical acid was recovered by distillation of the reaction. Upon removal of unreacted materials, the half stannous alcoholate of thiodiethanol was recovered.

Example 8

Copper acetate monohydrate was used in place of zinc acetate dihydrate in Example 4 in the absence of any solvent. The maximum temperature of the reaction was 150° C., and more than 50% of the theoretical acidic acid was recovered. Upon removal of unreacted materials, the half copper alcoholate of thiodiethanol was recovered.

Example 9

Lead acetate tri-hydrate was reacted in the same manner as given in Example 6. More than 50% of the acid was recovered. The product isolated from the reaction mass was the half lead alcoholate of thiodiethanol.

Example 10

A hydrocarbon solution of cobalt octoate was reacted with d-sorbitol at 150° C. Forty percent of the theoretical acid was recovered. No solvent was used. A cobalt alcoholate of d-sorbitol was recovered.

Example 11

A hydrocarbon solution of cadmium octoate was reacted with d-sorbitol at 150° C. and 15% of the theoretical octoic acid was recovered. A cadmium alcoholate of d-sorbitol was recovered.

Barium acetate, calcium acetate, nickel formate and aluminum acetate gave no reaction with thiodiethanol.

Products produced by the process of this invention are useful as stabilizers in various materials. In polypropylene, for example, the nickel alkoxides are particularly useful especially when used in combination with O,O'-bis-(p-alkylphenol) monosulfides. The amounts used are from 0.02% to 3% by weight. An example illustrating such as is as follows:

Example 12

| | Parts |
|---|---|
| Crystalline polypropylene | 100 |
| Nickel di-(ethyl thioethylene oxide) | 0.25 |
| O,O'-bis-(p-1,1,3,3-tetramethylbutylphenol) monosulfide | 0.5 |

Other examples illustrating a mode of using products produced by this process of this invention are as follows:

Example 13

| | Parts |
|---|---|
| Crystalline polypropylene | 100 |
| Nickel di-(1-hydroxy ethylene-2,2'-thioethylene-1-oxide) | 0.5 |
| O,O'-bis-(p-1,1,3,3-tetramethylbutylphenol) monosulfide | 0.25 |

Example 14

| | Parts |
|---|---|
| Crystalline polypropylene | 100 |
| Nickel di-(1-hydroxy ethyleneoxide) | 0.5 |
| O,O'-bis-(p-1,1,3,3-tetramethylbutylphenol) monosulfide | 0.5 |

Example 15

| | Parts |
|---|---|
| Crystalline polypropylene | 100 |
| Nickel di-(1-hydroxy ethoxy ethylene oxide) | 0.5 |
| O,O'-bis-(p-1,1,3,3-tetramethylbutylphenol) monosulfide | 0.5 |

The following example illustrates the use of the fatty acid-imidazoline condensation products having a functional tertiary nitrogen atom attached to a carbon atom alpha to the C—OH group.

Example 16

A nickel alkoxide was prepared by reacting nickel acetate with a beta-hydroxy ethyl derivative of a coconut fatty acid-imidazoline condensation product which alcohol had the following general formula prior to reaction with the nickel acetate:

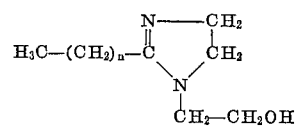

where $n$ is an integer from 6 to 12.

A nickel alkoxide of the above alcohol was prepared by heating the above mixture at about 150° C. and removing the acetic acid according to the method described in Example 3.

In the above examples, other previously described suitable carboxylic acids that can be used to prepare the metal alkoxide starting material are: propionic, butyric, isooctoic, 2-ethylbutanoic, cyclohexane carboxylic, acrylic, 3-(2-ethylbutoxy) propionic acid in which the acid preferably has about 2 to 8 carbon atoms. Less volatile acids containing greater numbers of carbon atoms (e.g., naphthenic acids of acid value of about 300) can be used, but more extreme conditions, particularly of vacuum, may be required to conduct the necessary reaction.

Also, in the above examples, as previously indicated, other alcohols can be used to produce the novel alkoxides according to the improved method of the present invention. For instance, alcohols that can be substituted in whole or part for the alcohols actually employed to provide substantially equivalent results are the following: tetrahydrofurfuryl alcohol, tetrahydropyrane-2-methanol, ethylthioethanol, triethanolamine, trimethylolpropane, pentaerythritol dicaprate, 1,3,propane diol, ethoxytriglycol, propylene glycol, ethylene glycol mono methyl ether, ethylene glycol mono-n-hexyl ether and N,N-diethyl aminoethanol and the beta hydroxy ethyl derivatives of fatty acid-imidazoline condensation products.

All of these polyfunctional alcohols have a functional group such as an oxygen atom, sulfur atom or tertiary amino nitrogen atom attached to a carbon atom alpha or beta to the carbon atom carrying the hydroxyl group.

What is claimed is:

1. A method of making a divalent metal alkoxide in which the metal replaces the hydrogen of an alcoholic OH group, the method comprising the steps of (A) reacting (a) a divalent nickel salt of an aliphatic monocarboxylic acid having 2 to 30 carbon atoms with (b) a polyfunctional organic alcohol having a functional group attached to a carbon atom in a position alpha to beta with respect to the carbon atom carrying the hydroxyl group and separated from said hydroxyl group by at least one methylene group, the alcohol being a member of the group consisting of (1) a fatty acid-imidazoline condensation product having the formula:

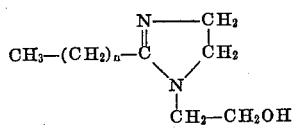

where $n$ is 6 to 20;

(2) a cyclic ether-alcohol that is a member selected from the group consisting of tetrahydrofurfuryl alcohol, tetrahydropyrane-2-methanol, and tetrahydropyrane-2-ethanol;

(3) an amino alcohol having the structure:

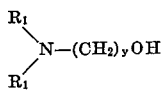

where $R_1$ is an alkyl radical of 1 to 3 carbon atoms and $y$ is an integer from 2 to 3; and (4) an alcohol having the general formula selected from the group consisting of:

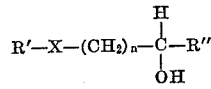

and

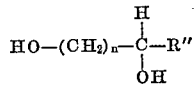

wherein $R'$ is a radical selected from the group consisting of alkyl, aryl, alkaryl, aralkyl, cycloalkyl, alkoxyalkyl, alkoxyaryl, aroxyalkyl, alkoxycycloalkyl, cycloalkoxyalkyl hydroxyalkyl, hydroxycycloalkyl and hydroxyalkoxyalkyl, X is selected from the group consisting of oxygen and sulfur, $R''$ is selected from the group consisting of hydrogen and $R'$; and $n$ is an integer from 1 to 2, and (B) removing the monocarboxylic acid formed in the reaction from the reaction mass.

2. A method as defined in claim 1 in which the alcohol is the alcohol designated as (1) a fatty acid-imidazoline condensation product having the formula:

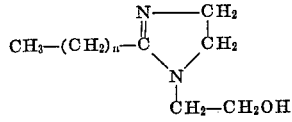

where $n$ is 6 to 20.

3. A method as defined in claim 1 in which the alcohol is the alcohol designated as (4) an alcohol having the formula selected from the group consisting of:

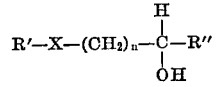

and

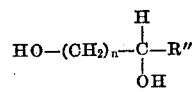

where $R'$ is a radical selected from the group consisting of alkyl, aryl, alkaryl, aralkyl, cycloalkyl, alkoxyalkyl, alkoxyaryl, aroxyalkyl, alkoxycycloalkyl, hydroxyalkyl, hydroxycycloalkyl and hydroxyalkoxyalkyl, X is selected from the group consisting of oxygen and sulfur, $R''$ is selected from the group consisting of hydrogen and $R'$ radicals; and $n$ is an integer from 1 to 2.

4. A method as defined in claim 1 in which the alcohol is the alcohol designated as (3) an amino alcohol having the structure:

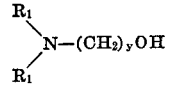

where $R_1$ is an alkyl radical of 1 to 3 carbon atoms and $y$ is an integer from 2 to 3.

5. A method as defined in claim 1 in which the alcohol is the alcohol designated as (2) a cyclic ether-alcohol that is a member selected from the group consisting of tetrahydrofurfuryl alcohol, tetrahydropyrane-2-methanol, and tetrahydropyrane-2-ethanol.

6. A method as defined in claim 1 in which the monocarboxylic acid is acetic acid.

7. A method as defined in claim 1 in which the alcohol is thiodiethanol.

8. A method as defined in claim 1 in which the alcohol is diethylene glycol.

9. A method as defined in claim 1 in which the alcohol is tetrahydrofurfuryl alcohol.

10. A method as defined in claim 1 in which the alcohol is tetrahydropyrane-2-methanol.

11. A method as defined in claim 1 in which the alcohol is the alcohol designated as alcohol (1) wherein $n$ is an integer from 6 to 12.

12. A nickel alkoxide of a polyfunctional alcohol, the alcohol having a functional group attached to a carbon atom in a position alpha to beta with respect to the carbon atom carrying the hydroxyl group and separated from said hydroxyl group by at least one methylene group, the alcohol being a member of the group consisting of (1) a fatty acid-imidazoline condensation product having the formula:

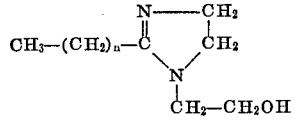

where $n$ is 6 to 20;

(2) a cyclic ether-alcohol that is a member selected from the group consisting of tetrahydrofurfuryl alcohol, tetrahydropyrane-2-methanol, and tetrahydropyrane-2-ethanol;

(3) an amino alcohol having the structure:

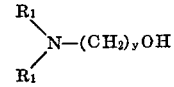

where $R_1$ is an alkyl radical of 1 to 3 carbon atoms and $y$ is an integer from 2 to 3; and (4) an alcohol having the formula selected from the group consisting of:

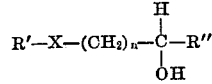

and

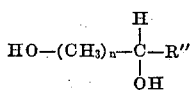

in which R' is an alkyl group having 1 to 18 carbon atoms, X is selected from the group consisting of oxygen and sulfur, R'' is selected from the group consisting of hydrogen and R' radicals; and n is an integer from 1 to 2.

13. A nickel alkoxide as defined in claim 12 in which the alcohol is the alcohol designated as
   (4) an alcohol having the formula selected from the group consisting of:

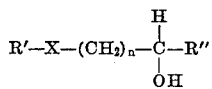

and

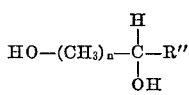

in which R' is an alkyl group having 1 to 18 carbon atoms, X is selected from the group consisting of oxygen and sulfur, R'' is selected from the group consisting of hydrogen and R' radicals; and n is an integer from 1 to 2.

14. A metal alkoxide as defined in claim 12 in which the alcohol is the alcohol designated as
   (1) a fatty acid-imidazoline condensation product having the formula:

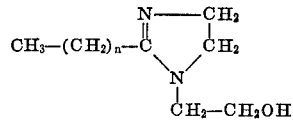

where n is 6 to 20.

15. A nickel alkoxide as defined in claim 12 in which the alcohol is tetrahydropyrane-2-methanol.
16. Nickel alkoxide of ethyl thioethanol.
17. Nickel alkoxide of thiodiethanol.
18. Nickel alkoxide of diethylene glycol.
19. Nickel alkoxide of tetrahydrofurfuryl alcohol.

20. Nickel alkoxide of a compound having the following formula:

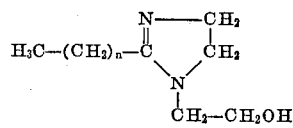

where n is an integer of from 6 to 12.

21. A method of preparing nickel alkoxide of thiodiethanol comprising the steps of reacting nickel acetate and thiodiethanol at a temperature of about 140 to 195° C., and continuously removing acetic acid formed by the above reaction to thereby provide nickel alkoxide of thiodiethanol.

22. A method of preparing nickel alkoxide of thiodiethanol comprising the steps of reacting nickel acetate tetrahydrate and thiodiethanol at a temperature of about 80 to 98° C. to thereby remove water from said reaction mixture, heating said reaction mixture to a temperature of 125 to 135° C. whereby the reaction mixture changes from a pasty solid mass to a dark green color, heating the mixture to a temperature of about 183° C., and removing acetic acid using vacuum while heating the mixture at said temperature of about 183° C. to thereby provide nickel alkoxide of thiodiethanol containing about 21.9% nickel.

References Cited

UNITED STATES PATENTS

| | | | |
|---|---|---|---|
| 2,666,774 | 1/1954 | Grenall | 260—429 |
| 2,828,265 | 3/1958 | Van Strien | 260—429 |
| 2,466,445 | 4/1949 | Landau | 260—439 |
| 2,999,872 | 9/1961 | Craig | 260—429.9 |

FOREIGN PATENTS 827,472  2/1960  Great Britian.

OTHER REFERENCES

Shukis et al.: J.A.C.S., vol. 65, pp. 2365–2366 (1943).
Merz: Journal American Oil Chemistry, vol. 32, No. 3, p. 177 (1955).
Gomer et al.: J.A.C.S., vol. 66, pp. 1331–1333 (1944).

HENRY R. JILES, *Primary Examiner.*